United States Patent [19]

Haraguchi

[11] Patent Number: 4,712,898
[45] Date of Patent: Dec. 15, 1987

[54] CAMERA BATTERY COVER FOR A CAMERA HAVING A CHAMBER FOR A BUILT IN BATTERY

[75] Inventor: Shosuke Haraguchi, Kanagawa, Japan

[73] Assignee: Canon Kabushiki Kaisha, Tokyo, Japan

[21] Appl. No.: 805,985

[22] Filed: Dec. 5, 1985

[30] Foreign Application Priority Data

Dec. 5, 1984 [JP] Japan .................................. 59-255662
Dec. 10, 1984 [JP] Japan .................................. 59-260521

[51] Int. Cl.⁴ ............................................. G03B 17/02
[52] U.S. Cl. ................................................. 354/288
[58] Field of Search ......................................... 354/288

[56] References Cited

U.S. PATENT DOCUMENTS 1,033,525 7/1912 Bornmann ............................ 354/288
3,777,639 12/1973 Lange .................................... 354/288

FOREIGN PATENT DOCUMENTS 2920787 11/1979 Fed. Rep. of Germany ...... 354/288
68825 4/1982 Japan .................................... 354/288
211131 12/1983 Japan .................................... 354/288

OTHER PUBLICATIONS

Research Disclosure 354–288, Feb. 1977, p. 27, Reibel 15436.

Primary Examiner—Donald A. Griffin
Attorney, Agent, or Firm—Toren, McGeady & Associates

[57] ABSTRACT

A camera provided with a battery chamber for a built-in-battery and a battery cover for covering the battery chamber. At least part of the battery cover is made of a conductive part. A body of the camera is provided with a connecting member to be connected to the conductive part when the battery cover is closed.

15 Claims, 13 Drawing Figures

CAMERA BATTERY COVER FOR A CAMERA HAVING A CHAMBER FOR A BUILT IN BATTERY

BACKGROUND OF THE INVENTION:

1. Field of the Invention

The present invention relates to a camera provided with a battery chamber for a built-in battery and a battery cover for covering the battery chamber.

2. Description of the Prior Art

Quite recently, cameras have become more and more automatic, and many cameras are provided with such efficiency features as automatic winding and rewinding, automatic focusing lens driving, and so on. Accordingly, the capacity of a power source battery becomes necessarily large. The increase in the capacity of the power source battery results in also an increase in the loading space thereof, so that places where the battery may be loaded are limited. Namely, the battery loading space is provided, generally, in the grip or the bottom of the camera. However, the grip is directly connected to an operation such as holding and so on, so that there takes place the restriction of the appearance and the form, and thus it is difficult to secure the desired loading space for the power source battery. On the other hand, in the bottom, four power source batteries can be loaded. However, the height of the camera as a whole becomes large, so that it goes without saying that it is necessary to make the camera compact and compress the mechanical parts.

Hereinafter, a camera in which a power source battery is loaded in the bottom of the camera is mentioned. Because, generally, four power source batteries are loaded, a battery cover with a large area is required. Because of the recent tendency to reduce weight and increase freedom of design, the battery cover is, in many cases, made of a plastic. Further, as to the camera body, for example, of a single lens reflex camera, the whole body is made of a metal, or at least a tripod mounting part is metal-inserted, in order to obtain the satisfactory strength. In the camera constructed as mentioned above, there are many places, such as an accessory shoe, a remote control terminal and so on, which may be connected from the outside of the camera, and which are connected to a metal part of the camera body to be on the same electric potential as the metal part. The reason for this is that the body of the camera is, generally, set at the ground level due to the circuit construction.

It has been experimentally found that there is a possibility that, in a case where such a camera is put on an electrostatically charged carpet or the like and a human body touches an exposed part of the camera such as an accessory shoe, the metal part of the camera body is electrically charged. When the camera is charged so much, a discharge takes place between the camera body and the carpet (via the power source battery arranged in the bottom or the like), so that a large voltage fluctuation occurs and, consequently, the misoperation or the breakage of a central processing unit (CPU) for controlling various signals takes place.

On the other hand, in the case of such a camera which requires a battery cover with a large area, an operation cover such as a battery cover is, generally, provided with hinges so as to prevent from the separation of the hinges from the camera body. Where such a large battery cover as mentioned above is required, too much load is often applied to the hinges at the time when the power source battery is loaded or unloaded. Accordingly, the hinges must be strong enough. Furthermore, because it is necessary to make the opening angle of the battery cover large enough not so as to disturb the loading and unloading operation of the power source battery, the hinges must be arranged at the position distant from the loading and unloading path of the power source battery. In order to satisfy the above-mentioned conditions, it is necessary to arrange strong hinges which requires a large space, at the position distant from (outside of) the loading and unloading path of the power source battery. It is disadvantageous for realizing a compact camera, especially, when the battery cover is formed of a plastic (because the wall thickness should be large in order to obtain strength).

It has been proposed to adopt a detachable battery cover which is not provided with hinges. However, generally speaking, while there is a danger of losing detachable parts, in the present case, the battery cover is large, so that there is no problem. However, in the case of a simply detachable battery cover, there is a possibility that the battery cover may be unexpectedly dropped at the time of the detaching operation, whereby, depending upon the environment, the recovery is impossible, so that such a problematic point should absolutely be avoided.

SUMMARY OF THE INVENTION

It is, accordingly, an object of the present invention to provide a camera capable of preventing undesired influence, such as the voltage fluctuation or the like, due to discharge when the camera is put on an electrostatically charged carpet or the like.

Other objects of the present invention will become apparent from the following detailed description of preferred embodiments thereof with reference to the accompanying drawings.

DETAILED DESCRIPTION OF THE PREFERRED EMBODIMENTS

Figure 1:
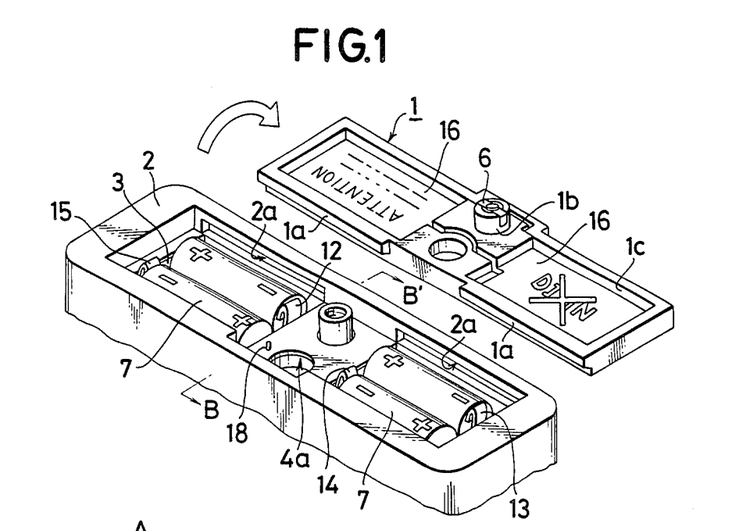
FIG. 1 is a perspective view showing a first embodiment of the present invention, in which a battery cover of the camera is opened.
Figure 2:
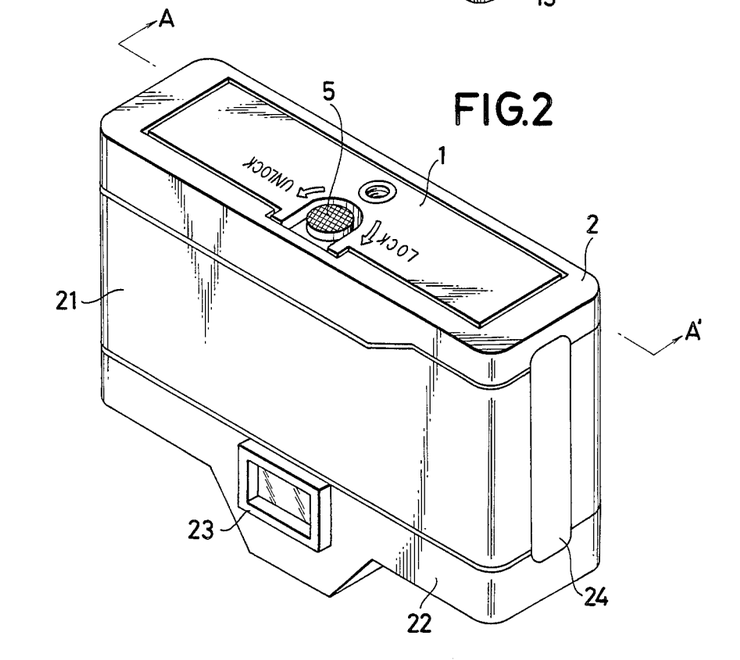
FIG. 2 is a perspective view showing the camera in which the battery cover is closed.
Figure 3:
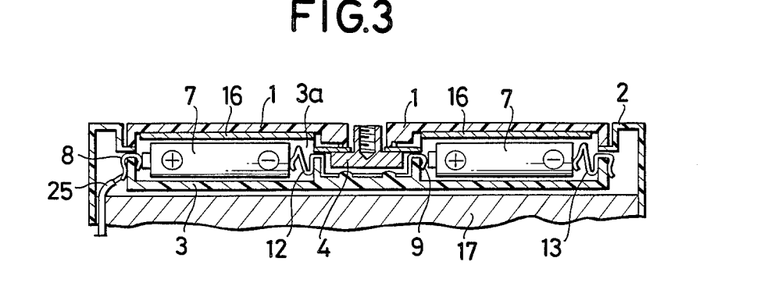
FIG. 3 is a sectional view as seen from the line A—A' of FIG. 2.

FIGS. 1 to 3 show a first embodiment of the present invention. FIG. 1 shows the state that the battery cover has been detached. FIG. 2 shows the camera as seen from the bottom thereof. FIG. 3 shows a section as seen from the line A—A' of FIG. 2. A battery cover 1 is mounted in such a manner that a projection 1a of the battery cover 1 is engaged with an engaging portion 2a formed in a base cover 2 and a battery case 3 (see FIGS. 1 and 3). When the battery cover 1 is mounted, a projecting portion 1b of the battery cover 1 is engaged into a lock portion 4a formed on a tripod mounting member 4 (see FIG. 3) made of a conductive material such as metal. In the projecting portion 1b, a shaft portion of an operation member 5, which penetrates a hole portion of a compression coil spring (not shown), is engaged. An engaging claw 6 is mounted to on the lower part of the shaft portion. In this state, when the operation member 5 is depressed into the lock portion 4a, and is rotated in the clockwise direction in FIG. 2 (up to the lock position), and then released, the engaging claw 6 secured on the lower part of the operation member 5 engages in a lock groove (not shown) provided on the lock portion 4a to lock the battery cover 1. The battery cover 1 is released from the lock position by rotating the operation member 5 in the counterclockwise direction (see FIG. 2) (up to the unlocked position). When the operation member 5 reaches the unlocked position, the engaging claw 6 is disengaged from the lock groove of the lock portion 4a. The operation member 5 springs out from an appearance plane part of the battery cover 1 and the base cover 2, namely the bottom plane of the camera, by the force of restoration of the compression coil spring arranged inside. The operation member 5 serves as a finger knob at the time of the disengaging operation of the battery cover 1. Four power source batteries 7 are arranged in a battery chamber 3a (see FIG. 3) formed with the base cover 2 and the battery case 3 on the bottom plane of the camera. The power source batteries 7 are connected in series via battery contacts 8–11 (contacts 10 and 11 not shown) in contact with the anodes of the batteries 7 and battery contract springs 12–15 in contact with the cathodes thereof.

A conductive plate 16 is cemented in an area covering the four power source batteries 7 and the battery contact springs 12–15, of the battery cover 1 at the side of the battery case 3 (see FIG. 1). The conductive plate 16 is cemented on the battery cover 1, being centered by engaging the plate 16 with the projecting portion 1b and being prevented from swinging by a rising-up portion 1c. This positioning is not limited to the above method, but there are many methods. Further, the conductive plate 16 is provided with a printed notice as to the attention of battery loading as shown in FIG. 1. The whole of a camera body 17 (see FIG. 3) is made of a conductive member such as metal, or at least the bottom plane thereof is made of a plastic inserted with a conductive member (in order to obtain the strength adapted for a single lens reflex camera).

Figure 4:
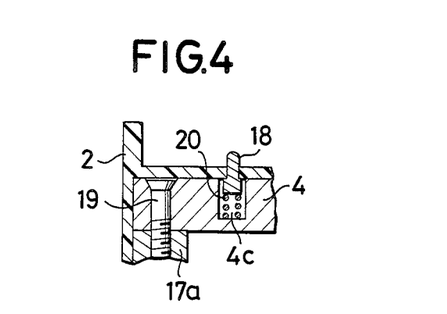
FIG. 4 is an enlarged sectional view of the important part as seen from the line B—B' of FIG. 1.

On the camera body 17, a ground connecting pin 18, whose enlarged detail is shown in FIG. 4, is arranged such that a head of the pin 18 projects out of a hole formed in the base cover 2. To explain the above further in detail, the ground connecting pin 18 is made of a conductive material such as metal and is arranged in a pin mounting hole 4c provided in the tripod mounting member 4 secured on a foot 17a of the camera body 17 by a screw 19, via a compression coil spring 20. Although the positional relation of the foot 17a of the camera body 17 has been omitted in FIG. 4, the foot 17a is arranged at the opposite position remote from the battery contact 9 and the battery contact spring 12. The diameter of the pin mounting hole 4c is chosen larger than that of the ground connecting pin 18 so as to allow for positional deviation of the base cover 2 and the tripod mounting member 4. The ground connecting pin 18 is normally urged upward in FIG. 4 by the compression coil spring 20, but is limited by the base cover 2 in the opened state of the battery cover 1. Furthermore, when the battery cover 1 is mounted as shown in FIG. 2 and locked, the ground connecting pin 18 comes into contact with the conductive plate 16 and is pushed into the hole 4c against the force of the compression coil spring 20, so that the conductive plate 16 assumes the same electric potential as that of the camera body 17, namely the ground level. When the unlock position is selected by the operation member 5 in this state, the ground connecting pin 18 is returned into the state shown in FIG. 4 by the force of the compression coil spring 20, so that the battery cover 1 is lifted. It contributes much to the increase in the efficiency of the detaching operation for the battery cover 1. In FIG. 2, 21 is a back cover, 22 is a top cover, 23 is an eyepiece frame, and 24 is a back cover claw loading cover, while, in FIG. 3, 25 is a lead wire.

Figure 5:
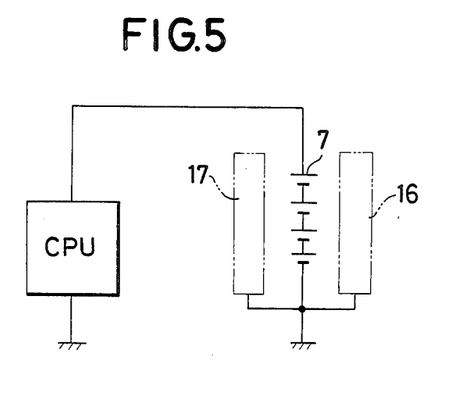
FIG. 5 is a block diagram showing an example of a circuit construction of the important part of the camera shown in FIG. 1.

When a camera is put on, for example, an electrostatically charged carpet (with the battery cover 1 held downward) and a human body is brought into contact with an exposed portion such as an accessory shoe or the like held at the ground level, an electric charge remains in the camera body 17 and so on, as mentioned above. At this time, the battery cover 1 and the base cover 2 made of an insulating material such as plastic are brought into contact with the carpet, but the tripod mounting member 4 made of a conductive material such as metal, does not. The above is a standard condition for camera construction, because the camera cannot be stably rested if the tripod mounting member 4 projects out of the bottom plane of the camera. When the above-mentioned electric charge amount becomes too high, there takes place a discharge. It is anticipated that the possibility that the discharge takes place between the tripod mounting member 4 and the carpet is the largest. However, it is difficult to conclude that the discharge takes place only at the above place. In such a case, the discharge takes place between the conductive plate 16 held at the same electric potential as that of the camera body 17 by the ground connecting pin 18 and the carpet. Therefore, misoperation or breakage of a central processing unit, which is likely to take place due to a large voltage fluctuation at the time when the discharge between the camera body 17 and the carpet passes through the power source batteries 7 or the battery contact springs 12–15, can be avoided, since the battery cover 1 is provided with the conductive plate 16. Namely, because the power source batteries 7 are, as shown in FIG. 5, sandwiched between the camera body 17 and the conductive plate 16 each having the same electric potential, the discharge passing through the power source batteries 7 or the like can safely be avoided.

In a practical embodiment with the construction as mentioned above, the data supports that, in case the conductive plate 16 is not provided, the problem such as which misoperation of the central processing unit takes place, in the case where the conductive plate 16 is provided, the central processing unit operates normally.

Figure 6:
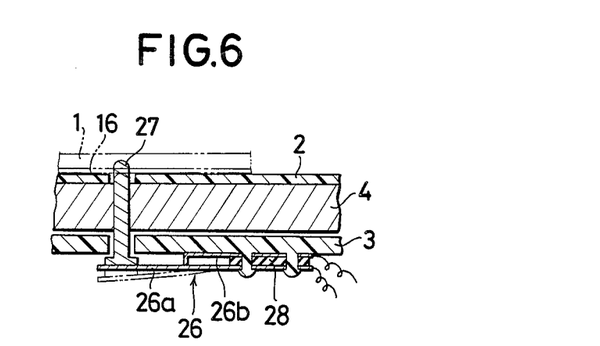
FIG. 6 is a sectional view of the important part of the second embodiment of the present invention.

FIG. 6 shows a second embodiment of the present invention. A battery cover detecting switch 26, which is used for a switch for discharging the residual electric charge in a time setting capacitor of a power-up clear circuit, is provided with a ground connecting pin 27. The battery cover detecting switch 26 is composed of a ground switch contact 26a and a switch contact 26b. The ground connecting pin 27 is secured to the ground switch contact 26a. The ground connecting pin 27 is made of a conductive material, where its head is slidably inserted into holes provided in the base cover 2, the tripod mounting member 4 and the battery case 3. 28 is an insulating member.

When the battery cover 1 is mounted (shown by a broken line in FIG. 6) the ground connecting pin 27 is brought into contact with the conductive plate 16 so as to hold the conductive plate 16 at the ground level. At this time, the ground connecting pin 27 is depressed downward by the battery cover 1 to open the battery cover detecting switch 26. When the battery cover 1 is detached, the battery cover detecting switch 26 is closed as shown by a solid line in FIG. 6.

In the first and second embodiments, the battery cover 1 is provided with the conductive plate 16 to prevent the power source batteries 7 and the battery contact springs 12-15 from entering into the discharge zone of the static electricity, so that misoperation and so on of the central processing unit can safely be avoided. Furthermore, the conductive plate 16 also can conveniently be used as an indication plate. Furthermore, when the strength of the conductive plate 16 is increased, the strength of the battery cover 1 itself is also increased. Furthermore, the battery cover 1 is urged by the ground connecting pin 18 in the direction in which the cover 1 is opened, so that the battery cover detaching operation is facilitated.

Although, in the first embodiment, the ground connecting pin 18 is provided in order to keep the conductive plate 16 at the same level as the ground level of the camera body 17 (when the battery cover 1 is mounted), it is not necessary to provide the ground connecting pin 18, if a conductive member is cemented on the battery case 3 or the base cover 2 forming the engaging portion 2a in which the projection 1a of the battery cover 1 is inserted, and set at the same potential as that of the camera body 17. Hereby, it is assumed that the conductive plate 16 is cemented even on the projection 1a. Furthermore, although so far the camera having the detachable battery cover 1 is mentioned, it goes without saying that the present invention can also be applied to, and camera having a hinge-type battery cover.

Furthermore, although the conductive plate 16 is cemented in an area covering the power source batteries 7 and the battery contact springs 12-15 at the side of the battery case 3 of the battery cover 1, the plate 16 can also be cemented at least on a part (for example, a part with which the ground connecting pin 18 is brought into contact) of the battery cover 1. Furthermore, either instead of the inside of the battery cover 1, the plate 16 can be cemented on the outside, or the whole battery cover 1 can be formed of a conductive material, or the battery cover 1 is covered with conductive coating or metal plated.

Below, a third embodiment of the present invention will be described with reference to FIGS. 7-11.

Figure 7:
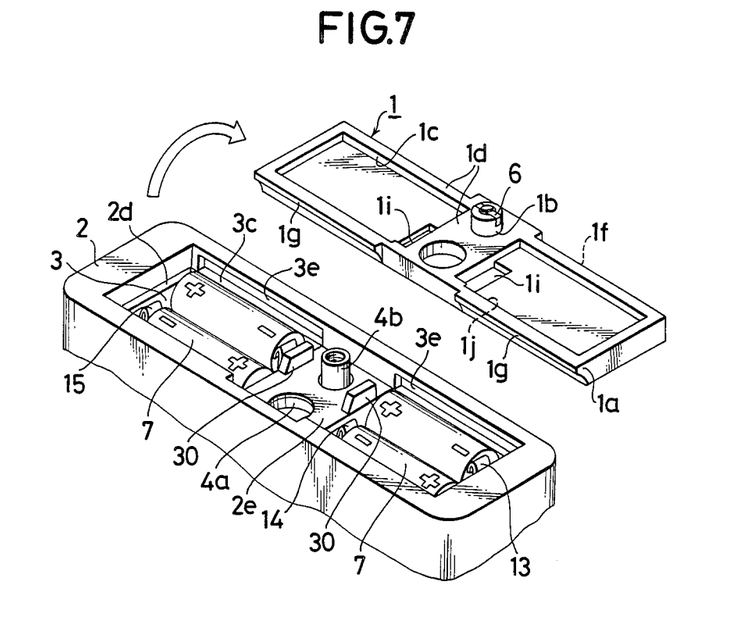
FIG. 7 is a perspective view showing a third embodiment of the present invention, in which the battery cover of the camera is opened.
Figure 8:
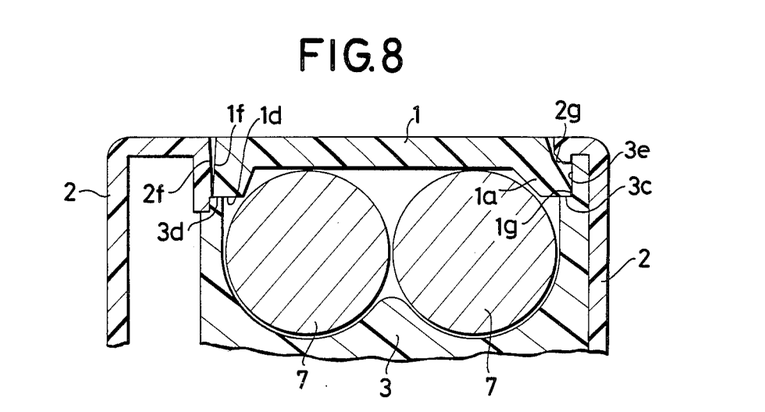
FIG. 8 is a sectional view showing the position of batteries, in which the battery cover of the camera shown in FIG. 7 is closed.
Figure 9:
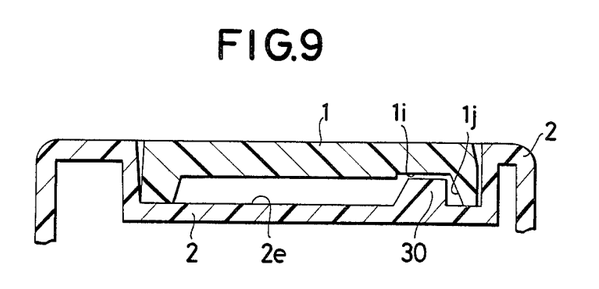
FIG. 9 is a sectional view showing the position of a restriction member, in which the battery cover of the camera shown in FIG. 7 is closed.

FIG. 7 shows the state that the battery cover 1 is detached, while FIGS. 8 and 9 are sectional views of FIG. 7. The battery cover 1 has an abutment 1d (the whole circumference and the central thick portion. When the battery cover 1 is mounted, the abutment 1d is brought into contact with receiving parts 2d and 2e of the base cover 2 and receiving parts 3c and 3d of the battery case 3 (see FIGS. 7 and 8), so that no deformation takes place under pressure from outside. Furthermore, play restriction parts 1f and 1g of the battery cover 1, play restriction part 2f of the base cover 2 and play restriction part 3e of the battery case 3 serve to restrict the rotation of the battery cover 1. 1b is a projection and 1i is a rotation restriction member escape part.

The base cover 2 is provided with rotation restriction members 30 as one body. At the time of detaching operation of the battery cover 1, the rotation restriction member 30 is brought into contact with a restriction part 1j such as a rising-up part of the battery cover 1 (see FIG. 9), so that the battery cover 1 opens by a predetermined angle (details are to be explained later).

Although the detachable battery cover 1 having no hinges contributes much to the realization of a compact camera, the battery cover 1 is unexpectedly let to fall down at the time of the detaching operation. This will be explained with reference to FIG. 10. When the battery cover 1 is detached, normally, with the base cover 2 held upward, a lens barrel 42 is held by the left hand. The operation member 5 is rotated up to the unlock position by the cushion of an index finger 50 of the right hand, and is hooked by the tip of the finger 50 to be opened in the direction of arrow "a" (see FIG. 10). However, if the battery cover 1 is opened unlimitedly during the above operation, the cover 1 may unexpectedly be dropped. It cannot be recovered depending upon the place. If, in such a case, the opening angle of the battery cover 1 is restricted to the position shown in FIG. 10, the unexpected drop can be avoided. Furthermore, if the second step operation to prevent from the detaching operation without completely holding the battery cover 1 with the finger tip is carried out, the falling down can safely be avoided. Furthermore, when, contrary to the state shown in FIG. 10, the battery cover 1 is dismounted with the base cover 2 held downward, the battery cover 1 is detached generally in the state where the battery cover 1 is held on the palm, so that the second step operation is tiresome. In such a case, the natural fall down is desired. The present embodiment is arranged also from this view point (details are to be explained later).

The opening angle restriction is effected by the rotation restriction members 30 provided on the base cover 2 and the restriction part 1j of the battery cover 1. Because the rotation restriction members 30 are arranged at the opposed positions relative to the tripod screw hole 4b remote from the loading position of the power source batteries 7, there is no difficulty for the realization of the compact camera. Furthermore, the members 30 are arranged close to the neighborhood of the operation member 5 (in case the battery cover 1 is mounted), so that it is possible to securely restrict the opening angle of the battery cover 1. Further, since a portion contributing much to the restriction of the opening angle consists of two parts, namely the base cover 2 and the battery cover 1, a sufficient size restriction accuracy can be obtained. At the position at which the power source batteries 7 are loaded (see FIG. 8), the projection 1a of the battery cover 1 enters into the space formed of a floatation restriction part 2g of the base cover 2, a receiving part 3c of the battery case 3 and a play restriction part 3e, to avoid the floatation of the battery cover 1 due to the movement of the power source batteries 7 by means of the play restriction part 1g and the floatation restriction part 2g.

As described above, instead of the hinges, the rotation restriction members 30 are arranged on both sides of the central hole portion 4b, and the floatation restriction member 2g is arranged at the one side of the power source battery loading parts on each side so as to make an effective use of the space.

Figure 10:
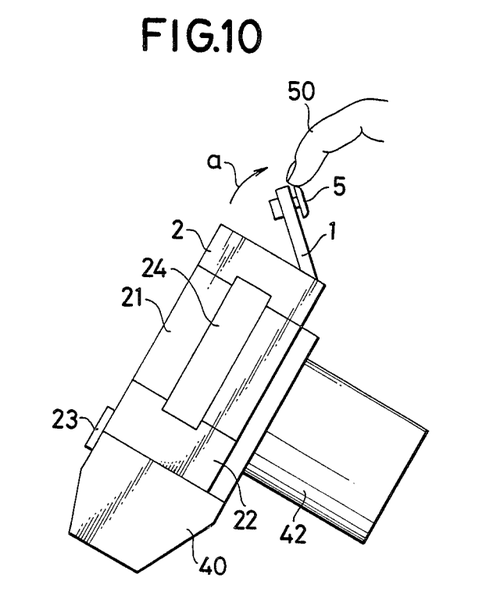
FIG. 10 is a side view of the camera shown in FIG. 7, explaining the opening operation of the battery cover.
Figure 11:
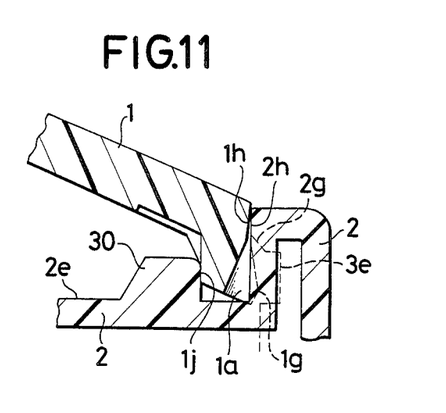
FIG. 11 is an enlarged sectional view of the important part of FIG. 9.

FIG. 11 is a sectional view of the neighborhood of the rotation restriction members 30 in the state shown in FIG. 10. When the base cover 2 is turned upward, the component of the own weight of the battery cover 1 and that of the pressure of the finger at the time of the opening operation act as the force to depress the battery cover 1 downward in FIG. 10. Along with the opening operation of the battery cover 1, the fulcrum is successively changed until finally the opening angle of the battery cover 1 is restricted when the restriction part 1j is brought into contact with the side face of the rotation restriction member 30 with the fulcrum which is a portion at which an angle 2h of the base cover 2 is in contact with an angle 1h of the battery cover 1. When, in the state of the predetermined opening angle, the battery cover 1 is lifted upward by fingers as the second step, the battery cover 1 is detached from the camera body. At this time, the play restriction part 1g of the battery cover 1 is moved up to the position at which it almost escapes the floatation restriction part 2g, so that the battery cover 1 can be detached only by lifting up. Although, in the present embodiment, in the completly lifted up position, the play restriction part 1g somewhat interferes with the floatation restriction part 2g, this can freely be chosen by optionally changing the angle setting of the operability and the floatation restriction.

Below, the case where the battery cover 1 is detached with the base cover 2 held downward will be described. When, in this case, the operation member 5 is brought into the unlock state, the battery cover 1 moves by its own weight in the direction in which it is separated from the base cover 2. Because, in this state, the base cover 2 is held on the palm, the battery cover 1 falls on the palm naturally due to its own weight. Therefore, the second step tiresome operation is not necessary. In a case where the above-mentioned operation (in the state shown in FIG. 10) is forcedly carried out with the base cover 2 held downward, the fall down is avoided by the pressing strength of the finger (strength to rotate the operation member 5 by the finger in the direction of the arrow "a") at the time of the opening operation. When a predetermined opening angle is reached (the position at which the restriction part 1j is brought into contact with the side face of the rotation restriction member 30), the further rotation is restricted so that, in the same way as mentioned above, the unexpected fall down can be avoided.

Figure 12:
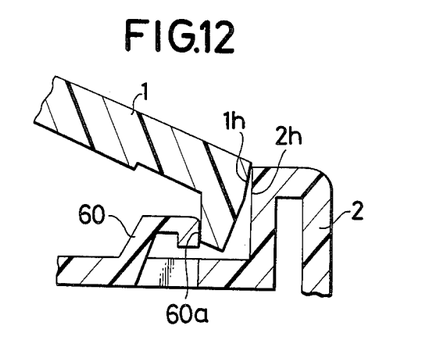
FIG. 12 is an enlarged sectional view of the important part, showing a fourth embodiment of the present invention.

FIG. 12 shows a fourth embodiment of the present invention, which is different from the third embodiment shown in FIGS. 7-11 in that a rotation restriction member is elastic. 60 is a rotation restriction member having a restriction part 60a. The restriction member 60 can be constructed as one body with the plastic base cover 2 even in this form. The construction shown in FIG. 12 has, besides the same effect as the opening angle restriction effect (alarm means for the operator for avoiding the unexpected fall down) of the third embodiment of FIGS. 9-11, an effect to detach the battery cover 1 in such a manner that the battery cover 1 is rotated due to the elastic deformation of the rotation restriction member 60 when the battery cover 1 is opened by a large strength with fingers after a predetermined opening angle is reached. Namely, the operation strength at the time of the rotation operation (by a finger on the operation member 5) as the first step is so weak that the rotation beyond the predetermined opening angle is impossible, while this rotation is only possible with a large operation strength with fingers on the battery cover 1 as the second step. It is aimed to avoid the tiresome work of the second step operation to change the operation direction. Furthermore, because the rotation restriction member 60 is an elastic body, it goes without saying that there is no problem that the rotation restriction member 60 might be broken at the time of the second operation.

Figure 13:
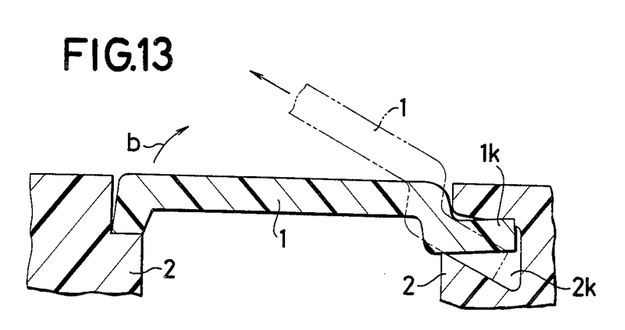
FIG. 13 is an enlarged sectional view of the important part, showing a fifth embodiment of the present invention.

FIG. 13 shows a fifth embodiment of the present invention. One side wall of the base cover 2 is provided with a rotation restriction groove 2k having an efficiency to avoid the floatation of one side 1k which nearly becomes the fulcrum of the battery cover 1 at the time of the opening operation and an efficiency to restrict the battery cover 1 in such a manner that beyond a predetermined opening angle (at the position shown by a two-dot-dash line) the battery cover 1 cannot be rotated in the direction of the arrow "b".

In the case of the third to fifth embodiments, the construction not provided with hinges contributes much to the realization of the simple appearance and the compact camera, the rotation of the battery cover 1 in the opening direction is restricted to a predetermined opening angle (shown in FIGS. 10 and 11), so that the unexpected fall down of the battery cover 1 can be avoided. Furthermore, when the battery cover 1 is detached with the base cover 2 held upward, the unexpected fall down is prevented with the second operation after the lock release. When the battery cover 1 is detached with the base cover 2 held downward, the battery cover 1 is let to fall down naturally on the palm after the lock release. Therefore, the security and the operability are improved. Furthermore, by forming the rotation restriction member 60 of an elastic body as shown in FIG. 12, the breakage under too large of a load can be avoided, while the operability when the battery cover 1 is detached with the base cover 2 held upward is further improved.

If, in FIG. 12, the elastic rotation restriction member 60 is made comparatively hard when the battery cover 1 is detached with the base cover 2 held downward, the battery cover 1 stops at a predetermined angle after the lock release, so that the natural fall down is prevented. To the contrary, when the member 60 is made comparatively soft, the battery cover 1 is let to fall down on the palm as mentioned above.

As described above, according to the present invention, at least part of the battery cover is made conductive, while a connecting member for electrically connecting the camera body with the conductive part in the state that the battery cover is closed, is provided, such that at least when the battery cover is closed, the conductive part of the battery cover is at the same potential as that of the camera body. Accordingly, the inferior influence due to the discharge of the static electricity can be avoided.

Further in the case of the embodiment of the present invention, there is provided with restriction means for restricting the rotation of the battery cover in the opening direction at a predetermined angle, such that, after the battery cover is restricted at the predetermined angle, a force is exercised in the direction in which the battery cover is put apart from the fulcrum to detach the battery cover. Therefore, the unexpected fall down of the battery cover at the time of detaching the battery cover can be avoided.

What is claimed is:

1. A camera comprising:
   (a) a camera body;
   (b) a battery chamber formed in said camera body;
   (c) a battery cover for covering said battery chamber, at least part of said battery cover being an electrically conductive part;
   (d) connecting means for electrically connecting said camera body with said electrically conductive part in a state where said battery cover is closed; and
   (e) detecting means for detecting closure of said battery cover, said detecting means detecting a connecting state of said connecting means with said electrically conductive part to detect the closure of said battery cover.

2. A camera comprising:
   (a) a camera body;
   (b) a battery chamber formed in said camera body;
   (c) a battery cover for covering said battery chamber, at least part of said battery cover being an electrically conductive part;
   (d) a ground level signal produced in a circuit in said camera body;
   (e) connecting means for electrically connecting said ground level signal with said electrically conductive part in a state where said battery cover is closed; and
   (f) detecting means for detecting closure of said battery cover, said detecting means detecting a connecting state of said connecting means with said electrically conductive part to detect the closure of said battery cover.

3. A battery cover construction for a camera comprising:
   (a) a battery chamber formed in a camera body and having an opening;
   (b) a battery cover detachably mounted on said opening;
   (c) battery cover support means formed on an edge of said opening, said support means supporting said battery cover rotatably, in which said battery cover can be detached when said battery cover is rotated to be opened beyond a predetermined angle; and
   (d) restriction means for restricting rotation of said battery cover in an opening direction to a predetermined angle, wherein said restriction means includes an elastically deformable projection member arranged to come into contact with said battery cover at a position where said battery cover has been rotated up to predetermined angle in an opening direction, said projection member being formed in said battery chamber.

4. A battery cover construction for a camera comprising:
   (a) a battery chamber formed in a camera body and having an opening;
   (b) a battery cover detachably mounted on said opening;
   (c) battery cover support means formed on an edge of said opening, said support means supporting said battery cover rotatably, in which said battery cover can be detached when said battery cover is rotated to be opened beyond a predetermined angle; and
   (d) restriction means for restricting rotation of said battery cover in an opening direction to a predetermined angle, wherein said restriction means is constructed by an angle setting of an internal surface of a hollow in which an end edge part of said battery cover is engaged, so that when said battery cover has been rotated up to the predetermined angle in an opening direction, said end edge part comes into contact with said internal surface to restrict the angle in the opening direction.

5. A camera comprising:
   (a) a camera body set at a ground level;
   (b) a battery chamber positioned near an outer surface of said camera body;
   (c) a battery cover for covering said battery chamber, said battery cover being formed of an electrically non-conductive material, and having an electrically conductive portion formed in a zone opposing to a zone in which the battery is housed; and
   (d) connecting means for electrically connecting said chamber body with said electrically conductive portion in a state when said battery cover is closed, said connecting means electrically non-connecting said camera body with said electrically conductive portion in a state when said battery cover is opened.

6. A camera according to claim 5, wherein said battery chamber is positioned at a base surface of said camera body.

7. A chamber according to claim 5, wherein said battery cover has said electrically conductive portion formed in a zone opposing to a zone which is occupied by battery contact springs contacting with the anode and cathode of said battery housed in said battery chamber.

8. A camera according to claim 5, wherein said battery cover has said electrically conductive portion formed in a zoom opposing to said battery.

9. A camera according to claim 5, wherein said connecting means comes electrically into contact with said electrically conductive portion of said battery cover.

10. A camera according to claim 9, wherein said connecting means elastically urges said battery cover in an opening direction.

11. A camera comprising:
    (a) a camera body;
    (b) a ground level signal produced in a circuit in said camera body;
    (c) a battery chamber positioned near an outer surface of said camera body;
    (d) a battery cover for covering said battery chamber, said battery cover being formed of electrically non-conductive material, and having an electrically conductive portion formed in a zone opposing to said battery chamber; and (e) connecting means for electrically connection said ground level signal with said electrically conductive portion in a state when said battery cover is closed, and said connecting means electrically not-connecting said ground level signal with said electrically conductive portion in a state when said battery cover is opened.

12. A battery cover construction for a camera comprising:

(a) a battery chamber formed in a camera body and having an opening;

(b) a battery cover detachably mounted on said opening;

(c) battery cover detachably mounted on said opening;

(d) battery cover support means formed on a edge of said cover, said support means supporting said battery cover rotatably, in which said battery cover can be detached when said battery cover is rotated to be opened beyond a predetermined angle; and (e) restriction means for restricting the rotation of said battery cover in an opening direction to a predetermined angle, wherein said battery cover support means is formed of a hollow body, in which an end edge part of said battery cover is engaged so that when said battery cover is rotated from closure to a predetermined angle in an opening direction, said end edge part enters into said hollow body, while when said predetermined angle has been reached, said end edge part goes out of said hollow body to detach said battery cover, and said battery chamber is positioned on the bottom of said camera body.

13. A construction according to claim 12 wherein said restriction means includes a projection member arranged to come into contact with said battery cover at a position where said battery cover has been rotated up to a predetermined angle in an opening direction, said projection member being formed in said battery chamber.

14. A construction according to claim 13, wherein said projection member is formed elastically deformable.

15. A construction according to claim 12 wherein said restriction means is constructed by an angle setting of an internal surface of a hollow in which an end edge part of said battery cover is engaged, so that when said battery cover has been rotated up to the predetermined angle in an opening direction, said end edge part comes into contact with said internal surface to restrict the angle in the opening direction.

* * * * *